(12) United States Patent  (10) Patent No.: US 11,361,692 B2
Huang  (45) Date of Patent: Jun. 14, 2022

(54) DISPLAY PANEL AND DISPLAY DEVICE

(71) Applicant: HKC CORPORATION LIMITED, Shenzhen (CN)

(72) Inventor: Beizhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 2 days.

(21) Appl. No.: 16/317,828

(22) PCT Filed: Jul. 19, 2018

(86) PCT No.: PCT/CN2018/096291
§ 371 (c)(1),
(2) Date: Jan. 15, 2019

(87) PCT Pub. No.: WO2019/161635
PCT Pub. Date: Aug. 29, 2019

(65) Prior Publication Data
US 2021/0358357 A1  Nov. 18, 2021

(30) Foreign Application Priority Data
Feb. 26, 2018 (CN) .......................... 201820271353.9

(51) Int. Cl.
*G09G 3/20* (2006.01)
(52) U.S. Cl.
CPC ....... *G09G 3/20* (2013.01); *G09G 2310/0267* (2013.01); *G09G 2310/0286* (2013.01);
(Continued)

(58) Field of Classification Search
CPC ............ G09G 3/20; G09G 2310/0267; G09G 2310/0286; G09G 2320/0223; G09G 2320/0242
See application file for complete search history.

(56) References Cited

U.S. PATENT DOCUMENTS

2007/0171215 A1* 7/2007 Song ................... G02B 6/0083
345/204
2007/0216845 A1  9/2007 Liao et al.
(Continued)

FOREIGN PATENT DOCUMENTS

CN  101446725 A  6/2009
CN  101847639 A  9/2010
(Continued)

*Primary Examiner* — Dmitriy Bolotin
(74) *Attorney, Agent, or Firm* — Kilpatrick Townsend & Stockton, LLP

(57) ABSTRACT

A display panel and a display device are disclosed. The display panel includes: a plurality of scanning line arranged in a first direction, a plurality of data lines arranged in a second direction, a first drive circuit and a second drive circuit. The first drive circuit has a plurality of scanning signal output ends connected to the plurality of scanning lines in one-to-one correspondence. The second drive circuit has a plurality of data signal output ends connected to the plurality of data lines in one-to-one correspondence. The plurality of data lines includes first data lines and second data lines, the distance between the first data line and the first drive circuit is less than that between the second data line and the first drive circuit, and the line width of the first data line is larger than that of the second data line.

18 Claims, 8 Drawing Sheets

(52) U.S. Cl.
CPC ............... *G09G 2320/0223* (2013.01); *G09G 2320/0242* (2013.01)

(56) References Cited

U.S. PATENT DOCUMENTS

| | | | | |
|---|---|---|---|---|
| 2016/0306212 A1* | 10/2016 | Lim | .................. | G02F 1/1345 |
| 2016/0377904 A1* | 12/2016 | Shin | .................. | G09G 3/20 |
| | | | | 257/776 |
| 2020/0365099 A1* | 11/2020 | Lius | .................. | G09G 3/3607 |

FOREIGN PATENT DOCUMENTS

| | | | |
|---|---|---|---|
| CN | 102005174 | A | 4/2011 |
| CN | 103336384 | A | 10/2013 |
| CN | 104503171 | A | 4/2015 |

\* cited by examiner

# DISPLAY PANEL AND DISPLAY DEVICE

CROSS-REFERENCE TO RELATED APPLICATIONS

This application is a U.S. national Stage of International Application No. PCT/CN2018/096291, filed on Jul. 19, 2018, designating the United States, which claims priority to Chinese Patent Application No. 201820271353.9, filed with the Chinese Patent Office on Feb. 26, 2018 and entitled "DISPLAY PANEL AND DISPLAY DEVICE", the content of each of which is hereby incorporated by reference in its entirety.

FIELD

The present disclosure relates to the field of display technologies, and more particularly relates to a display panel and a display device.

BACKGROUND

A display panel includes a plurality of scanning lines and a plurality of data lines, and a plurality of subpixels is defined by the plurality of scanning lines and the plurality of data lines. In the process of controlling display of the display panel, scanning signals are output to the plurality of scanning lines row by row, and meanwhile data signals are output to the data lines. The scanning signal on the scanning line turns on a corresponding subpixel, and the data signal on the data line is written into the turned-on subpixel, so as to drive the subpixel for light emitting display.

Due to RC loading on the scanning line, when certain RC delay exists on the scanning signal output on the scanning line, a waveform of a scanning signal at a tail end of the scanning line can have a certain change relative to a waveform of a scanning signal at a head end, which can cause low charging efficiency of some subpixels, and a color shift phenomenon, affecting the display effect.

SUMMARY

The present disclosure provides a display panel and a display device so as to solve the problem that because of delay of scanning signals, the charging efficiency is low, and improve the charging efficiency of subpixels.

An embodiment of the present disclosure provides a display panel, the display panel comprising: a display area; a non-display area encircling the display area; a plurality of scanning lines and a plurality of data lines located in the display area, and a first drive circuit and a second drive circuit located in the non-display area.

The plurality of scanning lines is arranged in a first direction, each of the plurality of scanning lines extends in a second direction, the plurality of data lines is arranged in the second direction, each of the plurality of data lines extends in the first direction, and the first direction is perpendicular to the second direction. The first drive circuit has a plurality of output ends, and each of the plurality of output ends is electrically connected to a corresponding scanning line. The plurality of data lines comprises first data lines and second data lines, the distance between the first data line and the first drive circuit is less than that between the second data line and the first drive circuit, and the line width of the first data line is larger than that of the second data line.

An embodiment of the present disclosure further provides another display panel, comprising: a rigid substrate, a plurality of scanning lines and a plurality of data lines arranged on the rigid substrate, a first drive circuit and a second drive circuit.

The plurality of scanning lines is arranged in a first direction, each scanning line extends in a second direction, and the first direction is substantially perpendicular to the second direction. The plurality of data lines is arranged in the second direction, and each data line extends in the first direction.

The first drive circuit has a plurality of scanning signal output ends, and the plurality of scanning signal output ends is connected to the plurality of scanning lines in one-to-one correspondence. The second drive circuit has a plurality of data signal output ends, and the plurality of data signal output ends is connected to the plurality of data lines in one-to-one correspondence.

In the second direction, and according to a sequence away from the first drive circuit, the line widths of the plurality of data lines are sequentially decreased.

An embodiment of the present disclosure further provides a display device, and the display device comprises the display panel provided by any embodiment of the present disclosure.

According to the technical solutions provided by the embodiments of the present disclosure, the line width of a data line close to a scanning drive circuit is larger than that of a data line away from the scanning drive circuit, RC delay of the data line close to the scanning drive circuit is about to be less than that of the data line away from the scanning drive circuit, the charging efficiency, by scanning signals and data signals, on subpixels on the display panel can be improved, and the display effect is improved.

DETAILED DESCRIPTION OF THE INVENTION

The following further describes the present disclosure in detail with reference to the accompanying drawings and embodiments. It may be understood that the embodiments described herein are merely used to explain the present disclosure rather than limit the present disclosure. In addition, it needs to be further noted that for ease of description, instead of all structures, only parts related to the present disclosure are shown in the accompanying drawings.

Figure 1:
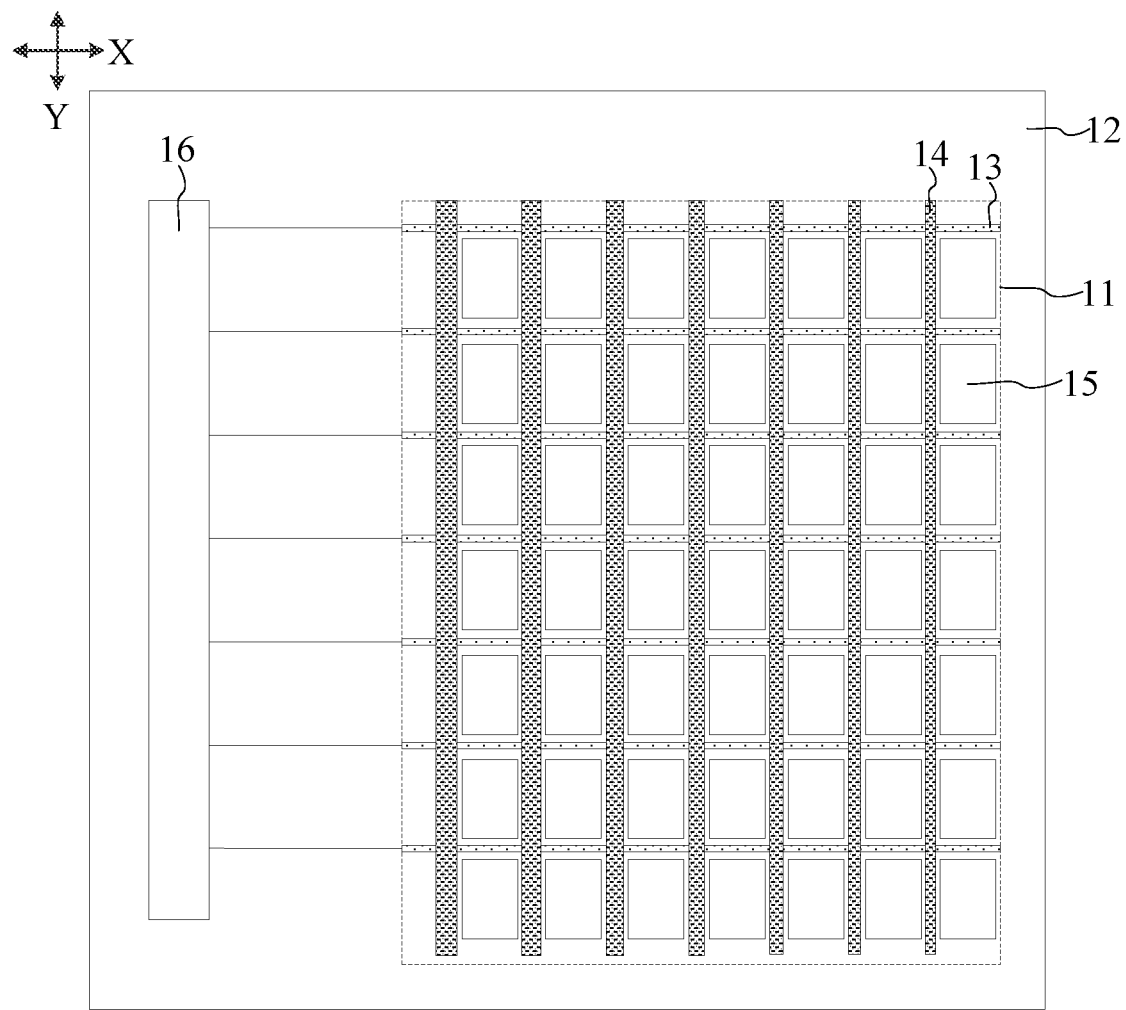
FIG. 1 is a schematic structural diagram of a display panel according to an embodiment of the present disclosure.

FIG. 1 is a schematic structural diagram of a display panel according to an embodiment of the present disclosure. Referring to FIG. 1, the display panel includes: a display area 11 and a non-display area 12 encircling the display area 11; a plurality of scanning lines 13 and a plurality of data lines 14 located in the display area 11, a plurality of subpixels 15 defined by the plurality of scanning lines 13 and the plurality of data lines 14, and a scanning drive circuit 16 located in the non-display area 12. The plurality of scanning lines 13 is arranged in a first direction Y, each scanning line 13 extends in a second direction X, the plurality of data lines 14 is arranged in the second direction X, each data line 14 extends in the first direction Y, and the first direction Y is perpendicular to the second direction X.

The scanning drive circuit 16 includes a plurality of output ends, and the output ends are electrically connected to corresponding scanning lines 13. The line width of a data line 14 in the display area 11, close to one side of the scanning drive circuit 16 is larger than that of a data line 14 away from one side of the scanning drive circuit 16.

In an embodiment, the scanning drive circuit 16 is arranged on a first side of the display area 11, and in the second direction X, from the first side of the display area 11 to a second side of the display area 11, the line widths of the data lines 14 are sequentially decreased.

In another embodiment, the display area 11 includes a first area and a second area, and the first area is closer to the scanning drive circuit 16 than the second area. The data lines 14 include first data lines located in the first area of the display area 11 and second data lines located in the second area of the display area 11. The line width of the first data line is larger than that of the second data line.

Each row of subpixels 15 may be electrically connected to one scanning line 13 correspondingly, and each column of subpixels 15 may be electrically connected to one data line 14 correspondingly. The plurality of output ends of the scanning drive circuit 16 is electrically connected to the plurality of scanning lines 13 in one-to-one correspondence. The plurality of output ends of the scanning drive circuit 16 sequentially outputs scanning signals. For instance, the scanning drive circuit 16 may include a plurality of cascaded shift registers, and an output end of each register is electrically connected to one scanning line 13. The scanning drive circuit 16 may be integrated on the display panel, or a driver chip bonded to the display panel may be used as the scanning drive circuit 16. The scanning drive circuit 16 outputs the scanning signals to the plurality of scanning lines 13 row by row, that is, the plurality of scanning lines 13 is charged row by row. A charged scanning line 13 turns on one row of subpixels 15 electrically connected to the charged scanning line 13, and the turned-on subpixel 15 receives a data signal on the data line 14.

Figure 2:
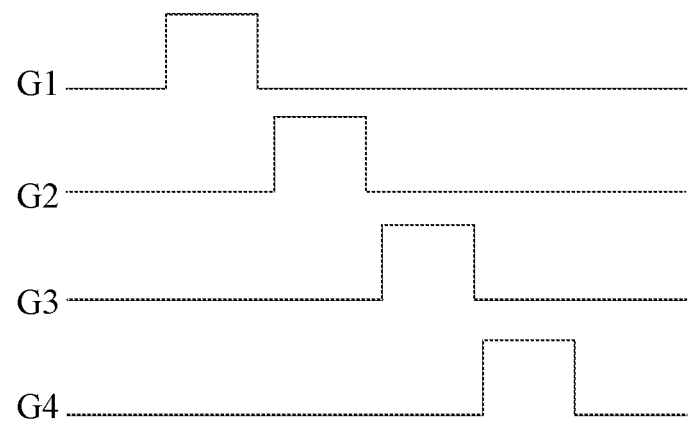
FIG. 2 is a driving timing diagram of scanning signals according to an embodiment of the present disclosure.
Figure 3:
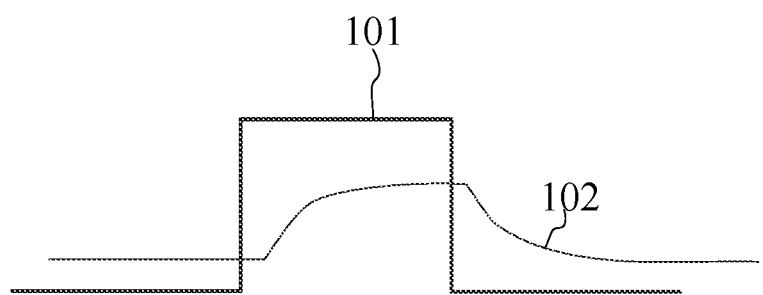
FIG. 3 is a signal waveform diagram according to an embodiment of the present disclosure.
Figure 4:
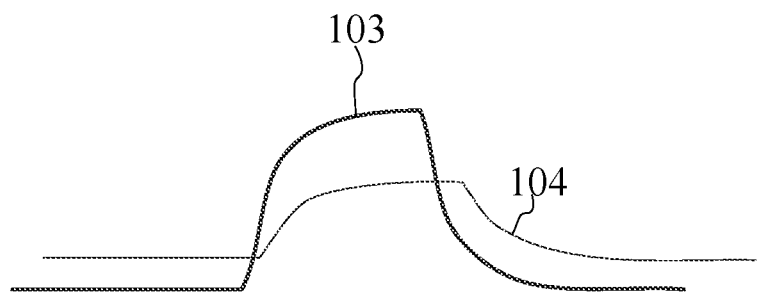
FIG. 4 is another signal waveform diagram according to an embodiment of the present disclosure.
Figure 5:
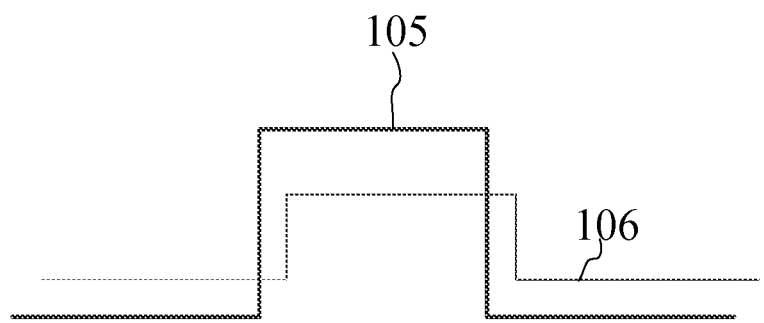
FIG. 5 is another signal waveform diagram according to an embodiment of the present disclosure.
Figure 6:
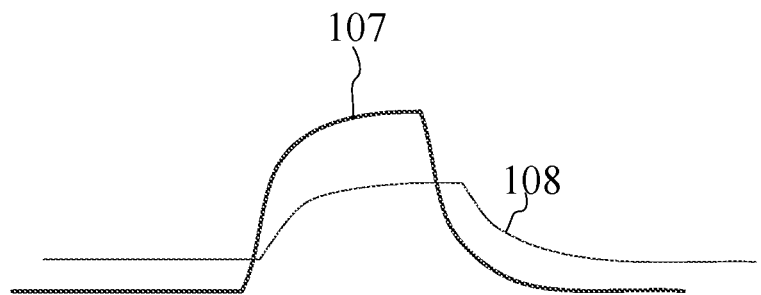
FIG. 6 is another signal waveform diagram according to an embodiment of the present disclosure.

FIG. 2 is a driving timing diagram of scanning signals according to an embodiment of the present disclosure. Referring to FIG. 2, G1, G2, G3, G4 . . . respectively show scanning signals provided by a scanning drive circuit 16 for a first row of scanning line, a second row of scanning line, a third row of scanning line, and a fourth row of scanning line . . . . According to distances, from near to far, away from the scanning drive circuit 16, that is, from left to right in FIG. 1, RC loading on the scanning line 13 becomes larger and larger. For one scanning line 13, RC delay of a scanning signal on a right side of the scanning line 13 is larger than that of a left side of the scanning line 13. Correspondingly, for one row of subpixels 15, RC delay of scanning signals received by the subpixels from the left side to the right side is larger and larger. Hereinafter, a first subpixel and a last subpixel, namely a subpixel on a leftmost side and a subpixel on a rightmost side, in a first row of subpixels 15 in FIG. 1 are used as an example for description. FIG. 3 is a signal waveform diagram according to an embodiment of the present disclosure, and FIG. 4 is another signal waveform diagram according to an embodiment of the present disclosure. In the embodiments shown in FIG. 3 and FIG. 4, the line widths of all data lines 14 are equal, a curve 101 is a waveform of a scanning signal received by the first subpixel in the first row of subpixel; a curve 102 is a waveform of a data signal received by the first subpixel in the first row of subpixel; a curve 103 is a waveform of a scanning signal received by the last subpixel in the first row of subpixel; a curve 104 is a waveform of a data signal received by the last first subpixel in the first row of subpixel. Referring to FIG. 3 and FIG. 4, a pulse of the scanning signal in the curve 101 and a pulse of the data signal in the curve 102 are relatively low in coincidence, and charging efficiency on the first subpixel is low; a pulse of the scanning signal in the curve 103 and a pulse of the data signal in the curve 104 are relatively high in coincidence, and charging efficiency on the last subpixel is high. Thus, charging of some the subpixels is not sufficient, thereby causing non-uniform display of the subpixels, and a color shift phenomenon. FIG. 5 and FIG. 6 are respectively another two signal waveform diagrams according to embodiments of the present disclosure. In the embodiments shown in FIG. 5 and FIG. 6, the line widths of the data lines 14 are decreased from left to right, that is, the line widths are sequentially decreased from a first data line 14 (a data line on a leftmost side) to a last data line 14 (a data line on a rightmost side). A curve 105 is a waveform of a scanning signal received by the first subpixel in the first row of subpixel; a curve 106 is a waveform of a data signal received by the first subpixel in the first row of subpixel; a curve 107 is a waveform of a scanning signal received by the last subpixel in the first row of subpixel; a curve 108 is a waveform of a data signal received by the last first subpixel in the first row of subpixel. Referring to FIG. 5 and FIG. 6, because the line width of the first data line 14 is relatively larger, RC delay of a data signal on the first data line 14 is small, that is, RC delay of the data signal received by the first subpixel in the first row is small, thus, a pulse in the curve 105 and a pulse in the curve 106 are high in coincidence, and the charging efficiency is high. The line width of the last data line 14 is relatively smaller, RC delay on the last data line 14 is large, that is, RC delay of the data signal received by the last subpixel 15 in the first row is large, and the received data signal is also relatively larger in delay compared with the first subpixel 15. A pulse in the curve 107 and a pulse in the curve 108 are high in coincidence, the charging efficiency is high, and the charging efficiency of all the subpixels 15 is high. The color shift phenomenon may be alleviated, thereby improving the display effect.

It should be noted that, the above example only takes the first row of subpixels 15 as an example, and for other rows of subpixels, the principle for improving the charging efficiency is the same as that of the first row of subpixels, and details are not described herein again.

Figure 7:
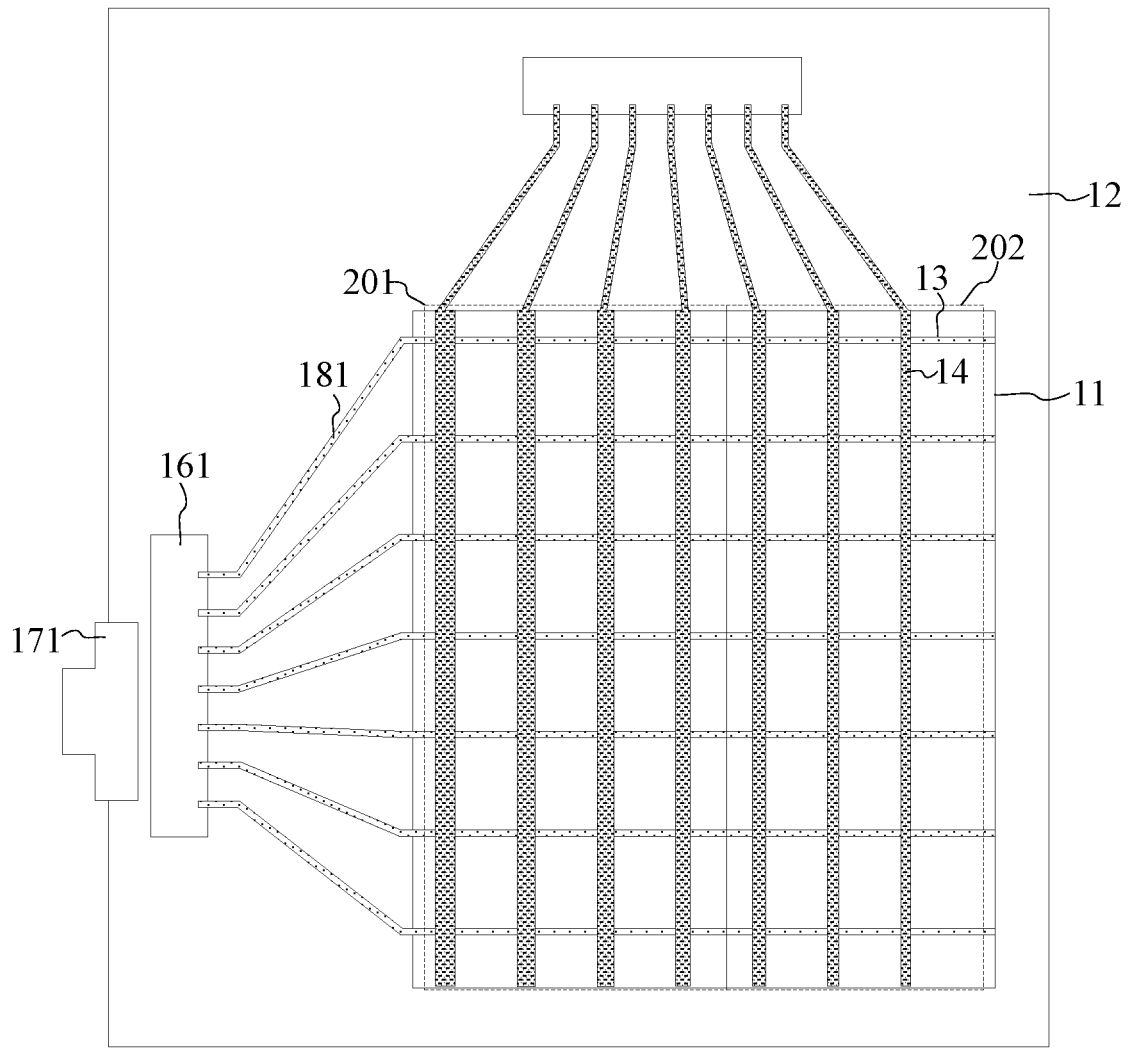
FIG. 7 is a schematic structural diagram of another display panel according to an embodiment of the present disclosure.

FIG. 7 is a schematic structural diagram of another display panel according to an embodiment of the present disclosure. Referring to FIG. 7, on the basis of the above embodiments, the display panel further includes a first flexible printed circuit 171 and a plurality of first fanout wires 181, and a scanning drive circuit includes a first driver chip 161.

The first driver chip 161 includes a plurality of scanning signal output ends which are set to output scanning signals. Each scanning signal output end is electrically connected to one corresponding scanning line 13 through one first fanout wire 181. The first driver chip 161 and the first flexible printed circuit 171 are bonded to the display panel.

Further, a display area 11 may include a first display area 201 (a left side area) and a second display area 202 (a right side area), and the second display area 202 is located on one side of the first display area 201 away from the scanning drive circuit. The electrical resistivity of a data line 14 of the first display area 201 is larger than that of a data line of the second display area 202. The electrical resistivity of the data line 14 located in the first display area 201 is larger than that of the data line 14 located in the second display area 202, impedance of the data line 14 in the left side area is further reduced, RC delay of a data signal on the data line 14 is reduced, and the charging efficiency on the subpixels is improved.

The data line located in the first display area 201 may be made of copper, and the data line located in the second display area 202 may be made of aluminum.

Figure 8:
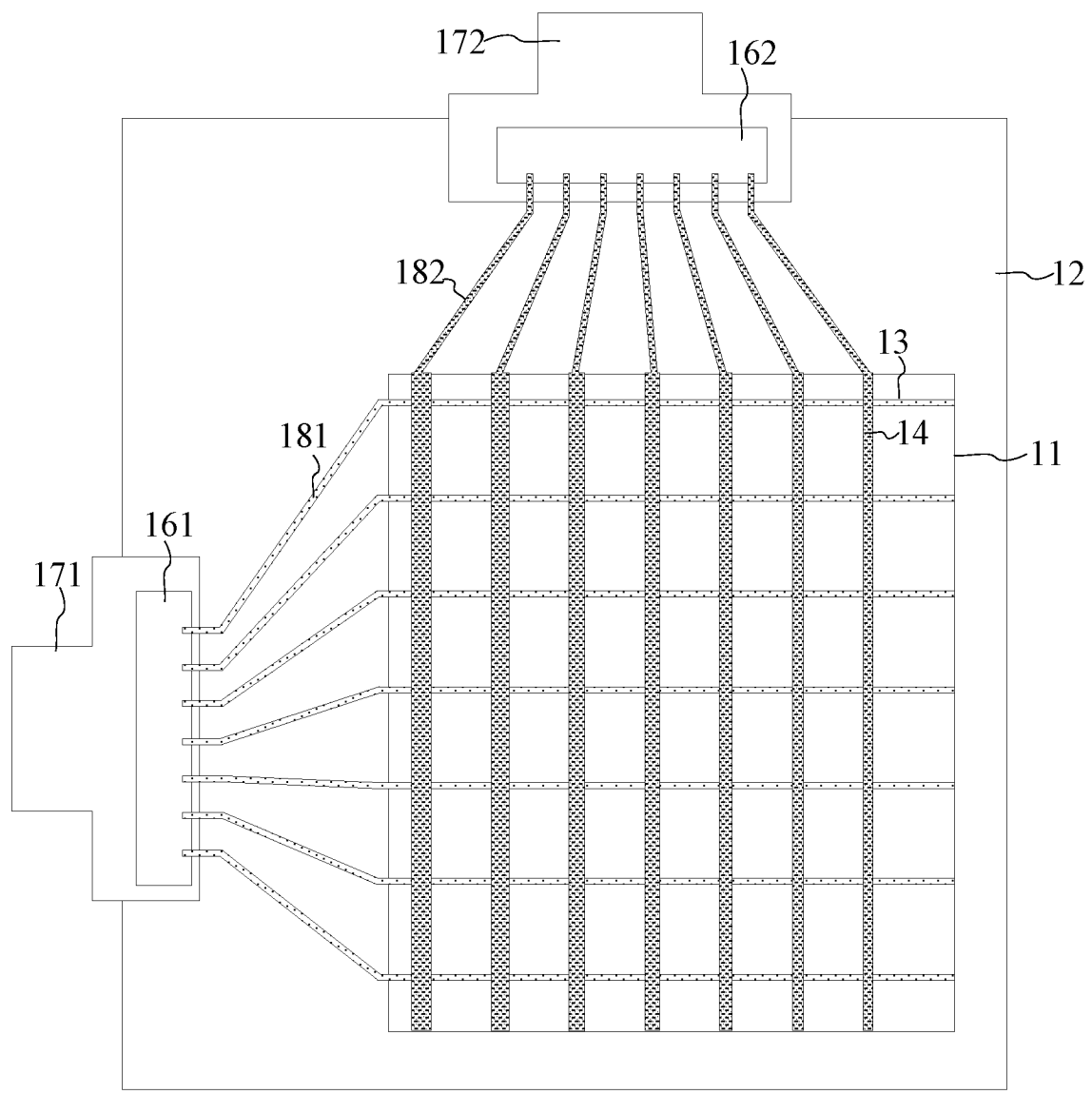
FIG. 8 is a schematic structural diagram of another display panel according to an embodiment of the present disclosure.

FIG. 8 is a schematic structural diagram of another display panel according to an embodiment of the present disclosure, different from the display panel shown in FIG. 7, the first driver chip 161 is bonded to the first flexible printed circuit 171, and the first flexible printed circuit 171 is bonded to the display panel.

Still referring to FIG. 8, the display panel according to this embodiment further includes a plurality of second fanout wires 182 located in the non-display area 12, and the plurality of second fanout wires 182 is sequentially arranged in the second direction X. Each second fanout wire 182 is electrically connected to a corresponding data line. For example, the plurality of second fanout wires 18 is electrically connected to the plurality of data lines 14 in one-to-one correspondence.

In the second direction X and away from the scanning drive circuit, the line widths of the second fanout wires 182 are sequentially decreased. In the embodiments of the present disclosure, in order to improve the charging efficiency, it is needed to decrease RC delay of data signals of subpixels from the first row to the last row step by step. The line widths of the second fanout wires 182 electrically connected to the data line 14 are also sequentially decreased, RC delay of the data signal on the first data line 14 is smaller, the charging efficiency is further improved, and the display effect is improved.

Still referring to FIG. 8, on the basis of the above embodiments, the display panel according to this embodiment of the present disclosure further includes a second driver chip 162 and a second flexible printed circuit 172, the second driver chip 162 and the second flexible printed circuit 172 are located on a side of the second fanout wire 182 away from the data line 14; and the second driver chip 162 is bonded to the second flexible printed circuit 172, and the second flexible printed circuit 172 is bonded to the display panel.

In other implementations of the embodiments of the present disclosure, the second driver chip 162 and the second flexible printed circuit 172 may also be both bonded to the display panel. Data signal output ends of the second driver chip 161 are electrically connected to the plurality of second fanout wires 182 in one-to-one correspondence.

Figure 9:
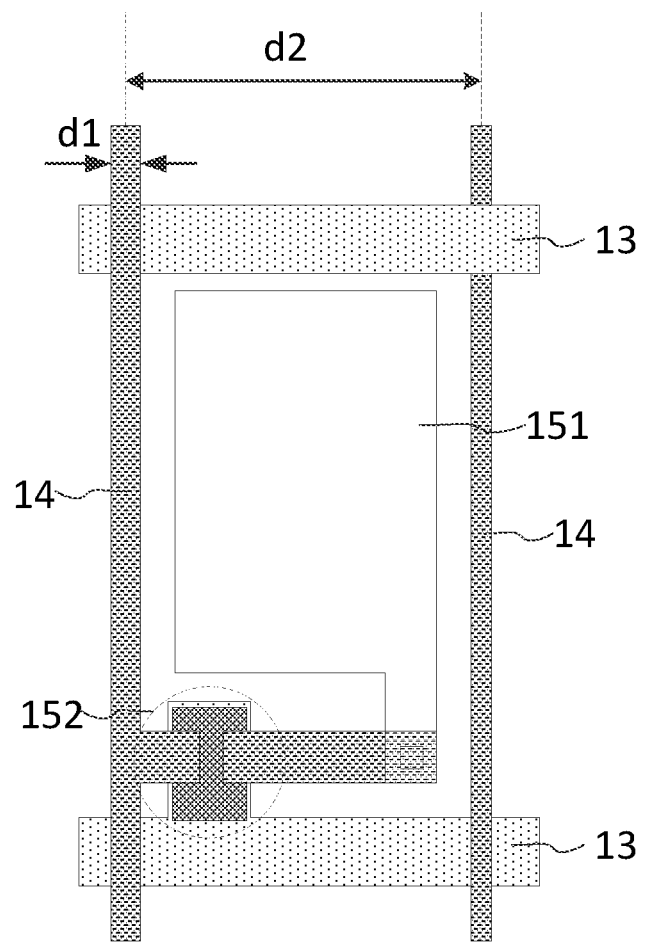
FIG. 9 is a schematic structural diagram of a subpixel according to an embodiment of the present disclosure.

In the embodiments of the present disclosure, the line width of the data line is larger than zero and smaller than or equal to half of an interval between adjacent data lines. FIG. 9 is a schematic structural diagram of the subpixels according to an embodiment of the present disclosure. Referring to FIG. 9, the display panel shows one subpixel. The subpixel includes a pixel electrode 151. The scanning line 13 is electrically connected to a gate electrode of a thin film transistor 152, the data line 14 is electrically connected to a source electrode (drain electrode) of the thin film transistor 152, and a drain electrode (source electrode) of the thin film transistor 152 is electrically connected to the pixel electrode 151. The line width d1 of the data line 14 is smaller than or equal to half of the interval d2 between the adjacent data lines. The larger the line width of the data line 14, the smaller RC delay of the data signal, but when the line width of the data line 14 is large, an aperture ratio of the subpixel can be affected, thus, when the line width of the data line 14 is larger than zero and smaller than or equal to half of the interval d2 between the two adjacent data lines 14, high charging efficiency is achieved on the subpixel, and the subpixel may also have a relatively larger aperture ratio, thereby improving the display effect.

Figure 11:
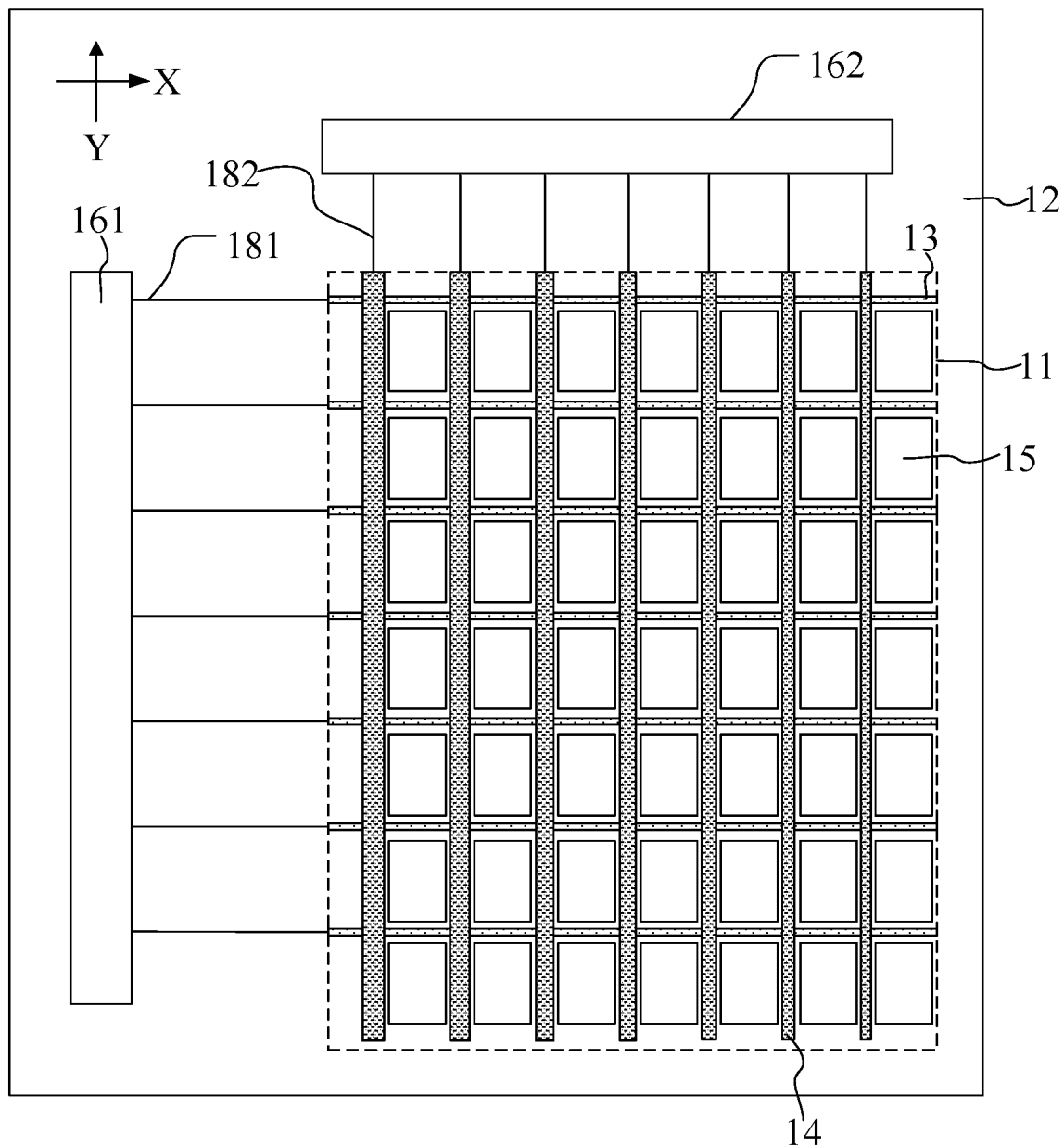
FIG. 11 is a schematic structural diagram of another display panel provided by an embodiment of the present disclosure.

The present disclosure further provides another display panel. As shown in FIG. 11, the display panel includes a rigid substrate. The rigid substrate includes a display area 11 and a non-display area 12 encircling the display area 11. A plurality of scanning lines 13 and a plurality of data lines 14 are arranged in the display area 11, and a plurality of subpixels 15 is defined by the plurality of scanning lines 13 and the plurality of data lines 14. The display panel further includes a first drive circuit 161 and a second drive circuit located in the non-display area 12.

Each subpixel 15 includes a thin film transistor and a pixel electrode. A gate electrode of the thin film transistor is electrically connected to a corresponding scanning line 13, a first electrode (such as a source electrode) is electrically connected to a corresponding data line 14, and a second electrode (such as a drain electrode) is electrically connected to the pixel electrode.

The plurality of scanning lines 13 is arranged in a first direction Y, and each scanning line 13 extends in a second direction X. The plurality of data lines 14 is arranged in the second direction X, and each data line 14 extends in the first direction Y. The first direction Y is perpendicular to the second direction X.

The first drive circuit 161 is located on a left side of the display panel shown in FIG. 11. The first drive circuit 161 has a plurality of scanning signal output ends, and the plurality of scanning signal output ends is connected to the plurality of scanning lines 13 in one-to-one correspondence. The first drive circuit 161 is set to sequentially provide scanning signals for the plurality of scanning lines 13.

The second drive circuit 162 is located on an upper side of the display panel shown in FIG. 11. The second drive circuit 162 has a plurality of data signal output ends, and the plurality of data signal output ends is connected to the plurality of data lines 14 in one-to-one correspondence. The second drive circuit 12 is set to provide data signals for the plurality of data lines 14.

In the second direction, and according to a sequence away from the first drive circuit 161, the line widths of the plurality of data lines 14 are sequentially decreased.

In an embodiment, the plurality of data lines 14 includes a first group of data lines and a second group of data lines.

The distance between any data line in the first group of data lines and the first drive circuit 161 is larger than that between any data line in the second group of data lines and the first drive circuit 161, and the electrical resistivity of the first group of data lines is larger than that of the second group of data lines. For example, the number of the plurality of data lines 14 is 2n, and the plurality of data lines 14 is sequentially arranged in the second direction X. First n data lines close to the first drive circuit 161 are the first group of data lines, and the remaining n data lines are the second group of data lines.

In an embodiment, the display panel further includes a plurality of first fanout wires 181 and a plurality of second fanout wires 182.

The plurality of first fanout wires 181 is arranged in the first direction, and the plurality of second fanout wires 181 is arranged in the second direction. Each scanning signal output end is connected to a corresponding scanning line 13 through one corresponding first fanout wire 181, and each data signal output end is connected to a corresponding data line 14 through one corresponding second fanout wire 182. In the second direction, and according to a sequence away from the first drive circuit 161, the line widths of the plurality of second fanout wires 182 are sequentially decreased. In an embodiment, the display panel further includes a first flexible printed circuit and a second flexible printed circuit. The first flexible printed circuit is bonded to the rigid substrate, the second flexible printed circuit is bonded to the rigid substrate, the first drive circuit 161 is bonded to the first flexible printed circuit, and the second drive circuit 162 is bonded to the second flexible printed circuit.

Figure 10:
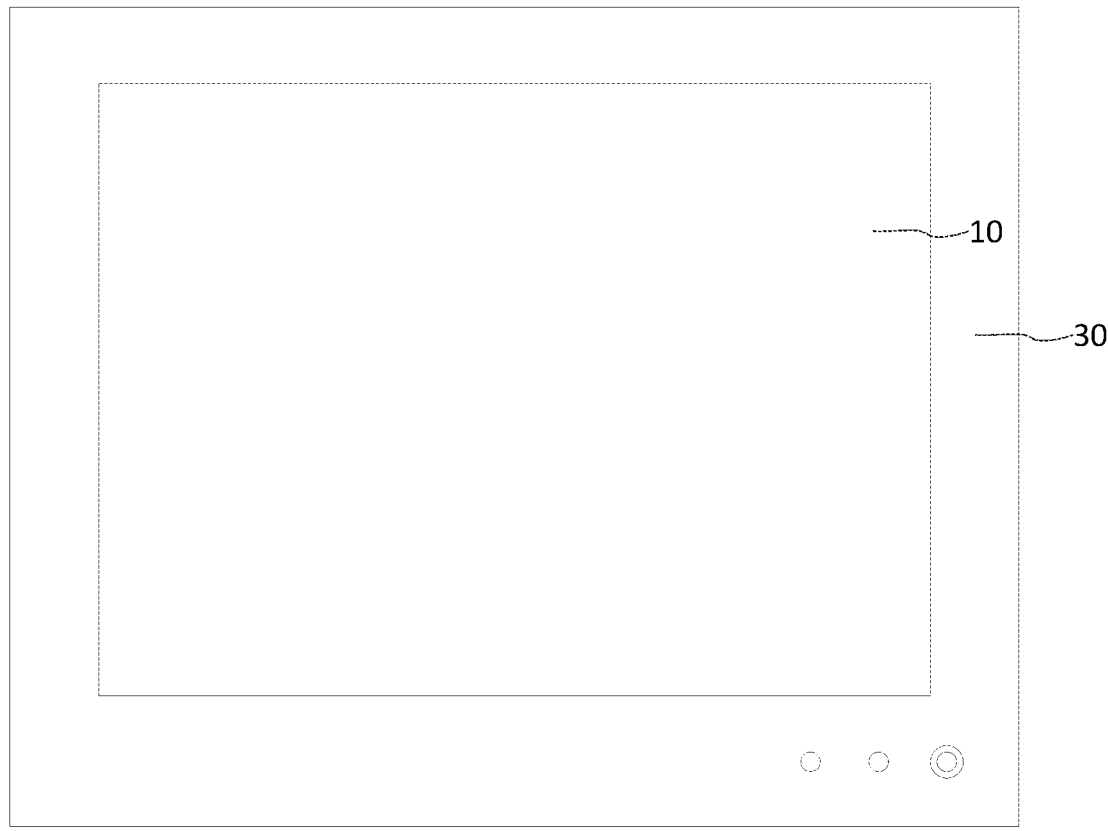
FIG. 10 is a schematic structural diagram of a display device according to an embodiment of the present disclosure.

An embodiment of the present disclosure further provides a display device. FIG. 10 is a schematic structural diagram of the display device according to the embodiment of the present disclosure. As shown in FIG. 10, the display device 30 includes the display panel 10 provided by any embodiment of the present disclosure. The display device 30 may be a display device in any type, such as a liquid crystal display (LCD), an organic light-emitting (OLED) device, a quantum dot light emitting diodes (QLED) display device or a curved surface display device or the like.

It should be noted that the above descriptions are merely some embodiments of the present disclosure and technical principles applied. It should be understood by persons skilled in the art that the present disclosure is not limited to the particular embodiments described herein. Persons skilled in the art can make various obvious changes, adjustments, and replacements without departing from the protection scope of the present disclosure. Therefore, although the present disclosure has been described in detail through the foregoing embodiments, the present disclosure is not limited to these embodiments, and can also include many other equivalent embodiments without departing from the concept of the present disclosure. The scope of the present disclosure is subject to the appended claims.

The invention claimed is:

1. A display panel, comprising:
   a display area;
   a non-display area encircling the display area;
   a plurality of scanning lines and a plurality of data lines located in the display area, wherein the plurality of scanning lines is arranged in a first direction, each of the plurality of scanning lines extends in a second direction, the plurality of data lines is arranged in the second direction, each of the plurality of data lines extends in the first direction, and the first direction is perpendicular to the second direction;
   a first drive circuit located in the non-display area, wherein the first drive circuit has a plurality of output ends, and each of the plurality of output ends is electrically connected to a corresponding scanning line; and
   a plurality of second fanout wires located in the non-display area,
   wherein the plurality of data lines comprises first data lines and second data lines, the distance between the first data line and the first drive circuit is less than that between the second data line and the first drive circuit, and the line width of the first data line is larger than that of the second data line; and
   the plurality of second fanout wires is arranged in the second direction, and each of the second fanout wires is electrically connected to a corresponding data line; and in the second direction, and away from the first drive circuit, the line widths of the second fanout wires are sequentially decreased.

2. The display panel according to claim 1, wherein in the second direction, and according to an ascending order of distances between the plurality of data lines and the first drive circuit, the line widths of the plurality of data lines are sequentially decreased.

3. The display panel according to claim 1, further comprising: a plurality of first fanout wires, wherein each of the plurality of output ends is electrically connected to one corresponding scanning line through one corresponding first fanout wire.

4. The display panel according to claim 3, wherein the first drive circuit is bonded to the display panel.

5. The display panel according to claim 4, further comprising a first flexible printed circuit bonded to the display panel.

6. The display panel according to claim 3, further comprising a first flexible printed circuit bonded to the display panels, wherein the first drive circuit is bonded to the display panel.

7. The display panel according to claim 1, further comprising a second driver chip and a second flexible printed circuit, wherein the second driver chip has a plurality of data signal output ends, and each data signal output end is electrically connected to one corresponding data line through one corresponding second fanout wire.

8. The display panel according to claim 7, wherein the second driver chip and the second flexible printed circuit are both bonded to the display panel.

9. The display panel according to claim 7, wherein the second driver chip is bonded to the second flexible printed circuit, and the second flexible printed circuit is bonded to the display panel.

10. The display panel according to claim 1, wherein the first data line and the second data line are two adjacent data lines in the plurality of data lines, the line width of the first data line is larger than zero and smaller than half of an interval between the first data line and the second data line.

11. The display panel according to claim 1, wherein the display area comprises a first display area and a second display area, and the second display area is located on a side of the first display area away from the first drive circuit; and
    the electrical resistivity of the data line located in the first display area is larger than that of the data line located in the second display area.

12. The display panel according to claim 11, wherein the data line of the first display area is made of copper, and the data line of the second display area is made of aluminum.

13. The display panel according to claim 1, wherein the electrical resistivity of the first data line is larger than that of the second data line.

14. A display panel, comprising:
a rigid substrate;
a plurality of scanning lines arranged on the rigid substrate, wherein the plurality of scanning lines is arranged in a first direction, each scanning line extends in a second direction, and the first direction is substantially perpendicular to the second direction;
a plurality of data lines arranged on the rigid substrate, wherein the plurality of data lines is arranged in the second direction, and each data line extends in the first direction;
a first drive circuit, having a plurality of scanning signal output ends, wherein the plurality of scanning signal output ends is connected to the plurality of scanning lines in one-to-one correspondence;
a second drive circuit, having a plurality of data signal output ends, wherein the plurality of data signal output ends is connected to the plurality of data lines in one-to-one correspondence; and
a plurality of first fanout wires and a plurality of second fanout wires,
wherein in the second direction, and according to a sequence away from the first drive circuit, the line widths of the plurality of data lines are sequentially decreased; and
the plurality of first fanout wires is arranged in the first direction, and the plurality of second fanout wires is arranged in the second direction; each scanning signal output end is connected to a corresponding scanning line through one corresponding first fanout wire, and each data signal output end is connected to a corresponding data line through one corresponding second fanout wire; and in the second direction, and according to a sequence away from the first drive circuit, the line widths of the plurality of second fanout wires are sequentially decreased.

15. The display panel according to claim 14, wherein the plurality of data lines comprises a first group of data lines and a second group of data lines, the distance between any data line in the first group of data lines and the first drive circuit is larger than that between any data line in the second group of data lines and the first drive circuit, and the electrical resistivity of the first group of data lines is larger than that of the second group of data lines.

16. The display panel according to claim 14, further comprising a first flexible printed circuit and a second flexible printed circuit, wherein the first flexible printed circuit is bonded to the rigid substrate, the second flexible printed circuit is bonded to the rigid substrate, the first drive circuit is bonded to the first flexible printed circuit, and the second drive circuit is bonded to the second flexible printed circuit.

17. A display device, comprising a display panel, wherein the display panel comprises:
a display area;
a non-display area encircling the display area;
a plurality of scanning lines and a plurality of data lines located in the display area, wherein the plurality of scanning lines is arranged in a first direction, each of the plurality of scanning lines extends in a second direction, the plurality of data lines is arranged in the second direction, each of the plurality of data lines extends in the first direction, and the first direction is perpendicular to the second direction;
a first drive circuit located in the non-display area, wherein the first drive circuit has a plurality of output ends, and each of the plurality of output ends is electrically connected to one corresponding scanning line; and
a plurality of second fanout wires located in the non-display area,
wherein the plurality of data lines comprises first data lines and second data lines, the distance between the first data line and the first drive circuit is less than that between the second data line and the first drive circuit, and the line width of the first data line is larger than that of the second data line; and
the plurality of second fanout wires is arranged in the second direction, and each of the second fanout wires is electrically connected to a corresponding data line; and in the second direction, and away from the first drive circuit, the line widths of the second fanout wires are sequentially decreased.

18. The display device according to claim 17, wherein in the second direction and according to a sequence away from the first drive circuit, the line widths of the data lines are sequentially decreased.

* * * * *